(12) United States Patent
Musial et al.

(10) Patent No.: US 8,594,648 B2
(45) Date of Patent: Nov. 26, 2013

(54) CALENDAR-BASED POWER RESERVE

(75) Inventors: John G. Musial, Newburgh, NY (US); Sandeep R. Patil, Pune (IN); Riyazahamad M. Shiraguppi, Pune (IN); Gandhi Sivakumar, Melbourne (AU); Prashant Sodhiya, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/403,484

(22) Filed: Feb. 23, 2012

(65) Prior Publication Data
US 2013/0227318 A1     Aug. 29, 2013

(51) Int. Cl.
*G06F 1/32*     (2006.01)

(52) U.S. Cl.
USPC .......................................... 455/418; 713/320

(58) Field of Classification Search
None
See application file for complete search history.

(56) References Cited

U.S. PATENT DOCUMENTS

| | | | |
|---|---|---|---|
| 5,684,404 A | 11/1997 | Millar | |
| 6,087,808 A | 7/2000 | Pritchard | |
| 6,427,072 B1 | 7/2002 | Reichelt | |
| 6,457,132 B1 | 9/2002 | Borgendale et al. | |
| 8,255,004 B2 * | 8/2012 | Huang et al. | 455/567 |
| 2004/0148533 A1 | 7/2004 | Nicholas | |
| 2008/0165714 A1 * | 7/2008 | Dettinger et al. | 370/311 |
| 2008/0201587 A1 | 8/2008 | Lee | |
| 2010/0063756 A1 | 3/2010 | Agrawal et al. | |
| 2010/0151918 A1 * | 6/2010 | Annambhotla et al. | 455/573 |
| 2010/0207585 A1 | 8/2010 | Duvalsaint et al. | |
| 2010/0245102 A1 * | 9/2010 | Yokoi | 340/636.16 |
| 2010/0321647 A1 | 12/2010 | Schuler | |
| 2011/0071780 A1 * | 3/2011 | Tarkoma | 702/63 |
| 2011/0072292 A1 | 3/2011 | Khawand | |
| 2011/0076994 A1 | 3/2011 | Kim et al. | |
| 2011/0080141 A1 | 4/2011 | Matsumura | |
| 2011/0083025 A1 * | 4/2011 | Lee | 713/320 |
| 2011/0207509 A1 | 8/2011 | Crawford | |
| 2011/0320828 A1 * | 12/2011 | Boss et al. | 713/300 |

FOREIGN PATENT DOCUMENTS

| | | |
|---|---|---|
| EP | 2286315 | 2/2011 |
| WO | 2009120442 | 10/2009 |
| WO | 2011033378 | 3/2011 |

OTHER PUBLICATIONS

Ravi, "Context-aware battery management for mobile phones: A feasibility study", Paper, [http://citeseer.ist.psu.edu/viewdoc/summary?doi=10.1.1.137.2203] pp. 1-10 (2006).

(Continued)

*Primary Examiner* — Marcos Batista
*Assistant Examiner* — Frank Donado
(74) *Attorney, Agent, or Firm* — Cantor Colburn LLP; Louis Percello

(57) ABSTRACT

Implementing calendar-based power reserve includes identifying a new calendar entry scheduled into a calendar application of a mobile communications device. The new calendar entry specifies a telephone call. Upon determining a priority indicator has been set for the new calendar entry in the calendar application, the calendar-based power reserve also includes directing a power management component of the mobile communications device to reserve an amount of power for the telephone call, and updating a battery power indicator on the mobile communications device to reflect a capacity of a battery of the mobile communications device. The capacity reflects a current amount of available power for the battery minus the amount of power to reserve.

5 Claims, 4 Drawing Sheets

(56) References Cited

OTHER PUBLICATIONS

Wanghong Yuan et al, "ReCalendar—Calendaring and Scheduling Applications with CPU and Energy Resource Guarantees for Mobile Devices", University of Illinois, Proceedings of the First IEEE International Conference on Pervasive Computing and Communications, pp. 1-8 (2003).

* cited by examiner

CALENDAR-BASED POWER RESERVE

BACKGROUND

The present invention relates to mobile communications devices and, more specifically, to mobile communications devices having a calendar-based power reserve.

Mobile communications devices, such as cellular telephones, personal digital assistants, and tablet personal computers provide ever-increasing functionality due to rapid improvements in processing power, storage capacities, graphics, high-speed connectivity, etc. However, due to such advances in technology, the amount of energy consumed by these devices is also increased. As a result, users of these devices must be diligent in their efforts to efficiently manage the battery power by continuously checking the energy status of the device and recharging the device when needed.

SUMMARY

According to another embodiment of the present invention, a mobile communications device having a calendar-based power reserve is provided. The mobile communications device includes a computer processor and a power reserve application executable by the computer processor. The power reserve application implements a method. The method includes identifying a new calendar entry scheduled into a calendar application of a mobile communications device. The new calendar entry specifies a telephone call. Upon determining a priority indicator has been set for the new calendar entry in the calendar application, the method includes directing a power management component of the mobile communications device to reserve an amount of power for the telephone call, and updating a battery power indicator on the mobile communications device to reflect a capacity of a battery of the mobile communications device. The capacity reflects a current amount of available power for the battery minus the amount of power to reserve.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

According to an exemplary embodiment, calendar-based power reserve for mobile communications devices is provided. The calendar-based power reserve provides a means to reserve and lock an amount of battery power in a mobile communications device for utilization during an upcoming scheduled event where the user has indicated within the calendar entry that his/her attendance via the mobile communications device is important or mandatory. These and other features of the calendar-based power reserve will now be described.

Figure 1:
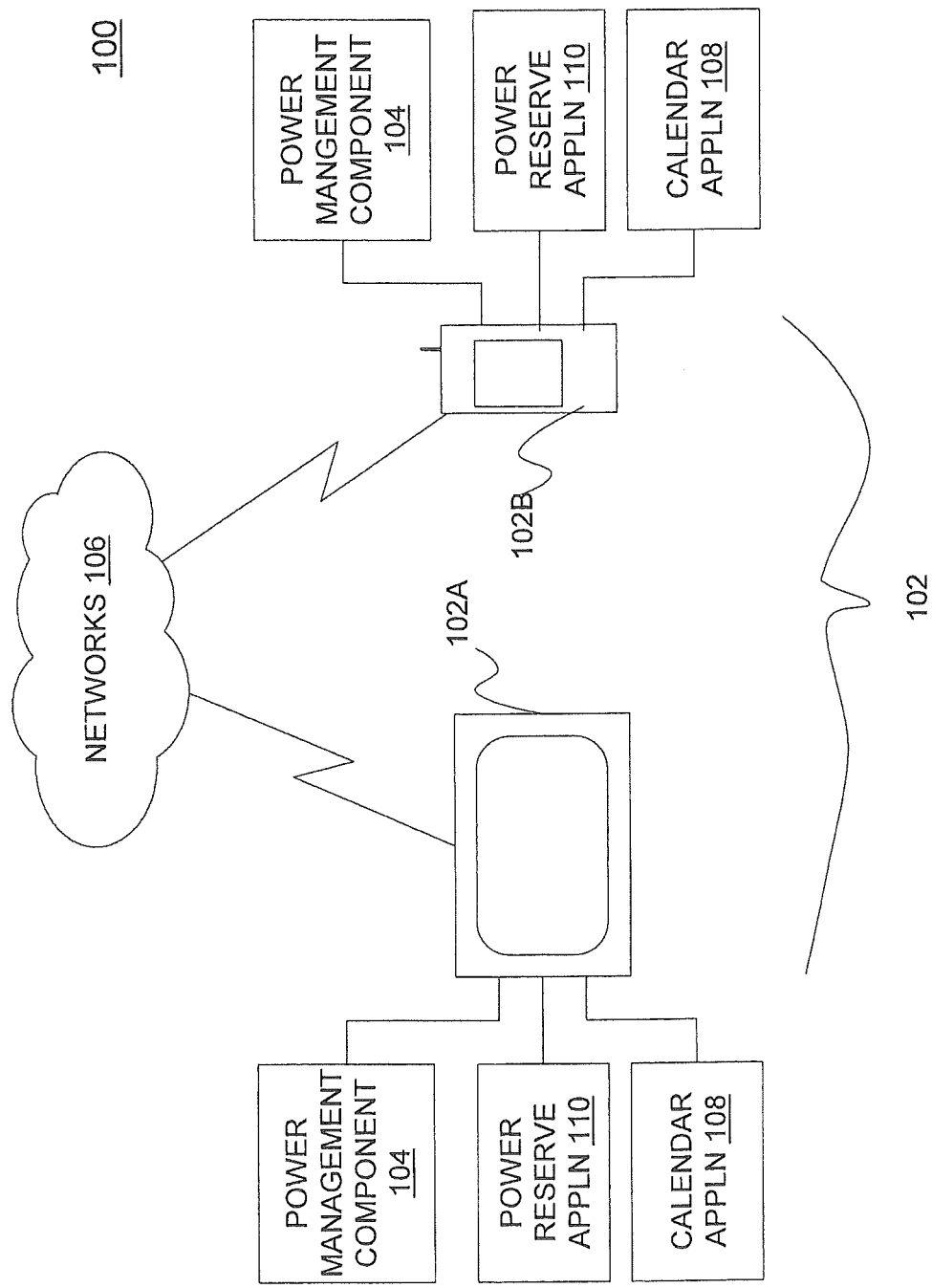
FIG. 1 depicts a block diagram of a system upon which calendar-based power reserve may be implemented according to an embodiment of the present invention.

Turning now to FIG. 1, a system 100 upon which the calendar-based power reserve may be implemented will now be described in an exemplary embodiment. The system 100 of FIG. 1 includes mobile communications devices 102 in communication with one or more networks 106. As shown in FIG. 1 for purposes of illustration, the mobile communications devices 102 include a tablet computer 102A and a cellular telephone 102B. However, it will be understood that other mobile communications devices may also be utilized in implementing the exemplary calendar-based power reserve features. For example, a personal digital assistant (PDA), smart phone, laptop, or other device having wireless calling capabilities may be used. The mobile communications devices 102 may be implemented using computer processors operating in response to computer programs stored in a storage medium accessible by the processors.

Each of the mobile communications devices 102 include a chargeable battery (not shown) as are typically found in such devices. Each of the mobile communications devices 102 also includes a power management component 104, a calendar application 108, and a power reserve application 110.

The power management component 104 monitors the battery power of the mobile communications device 102 and reserves an amount of battery power as directed by the power reserve application 110. The power management component 104 may be implemented in hardware, software, or a combination thereof. The power management component 104 is configured to communicate with the power reserve application 110 and perform power reservation activities in response to instructions from the power reserve application 110, as will be described further herein.

The calendar application 108 provides a user interface that allows user of the mobile communications device 102 to schedule and track activities or events via the mobile communications device 102. The user interface may be configured to provide different calendar views (e.g., daily, weekly, monthly) of scheduled events, as well as related functionality, such as setting alerts or reminders, scheduling recurring events, and sharing calendars with other individuals or mobile communications devices. The calendar application 108 may be a stand-alone application that exists only on the mobile communications device 102 and is accessible only by the owner of the mobile communications device 102. In another embodiment, the calendar application 108 may be configured to synchronize entries and data with a remote calendar application, for example, where the mobile communications device 102 owner is among a group of people that have access to the calendar (e.g., a team of individuals all have access to a calendar for team meetings, and one of the team members is the calendar owner).

The power reserve application 110 is configured to communicate with the calendar application 108 and the power management component 104 to identify scheduled events that are considered a priority, to calculate an amount of power needed to conduct scheduled events having the priority, and to reserve the calculated amount of power so that the amount of power is ready and available to the user at the time of the scheduled event. The power reserve application 110 may be configured as a plug-in to an existing calendar application. While shown as separate components, it will be understood that the power reserve application 110 and the calendar application 108 may be configured as a single, integrated application that performs all of the features of its individual components.

The networks 106 may include any type of known networks including, but not limited to, cellular, satellite, and terrestrial. The networks 106 may include a wide area network (WAN), a local area network (LAN), a global network (e.g. Internet), a virtual private network (VPN), and an intranet. The networks 106 may be implemented using any kind of physical network implementation known in the art.

Figure 2:
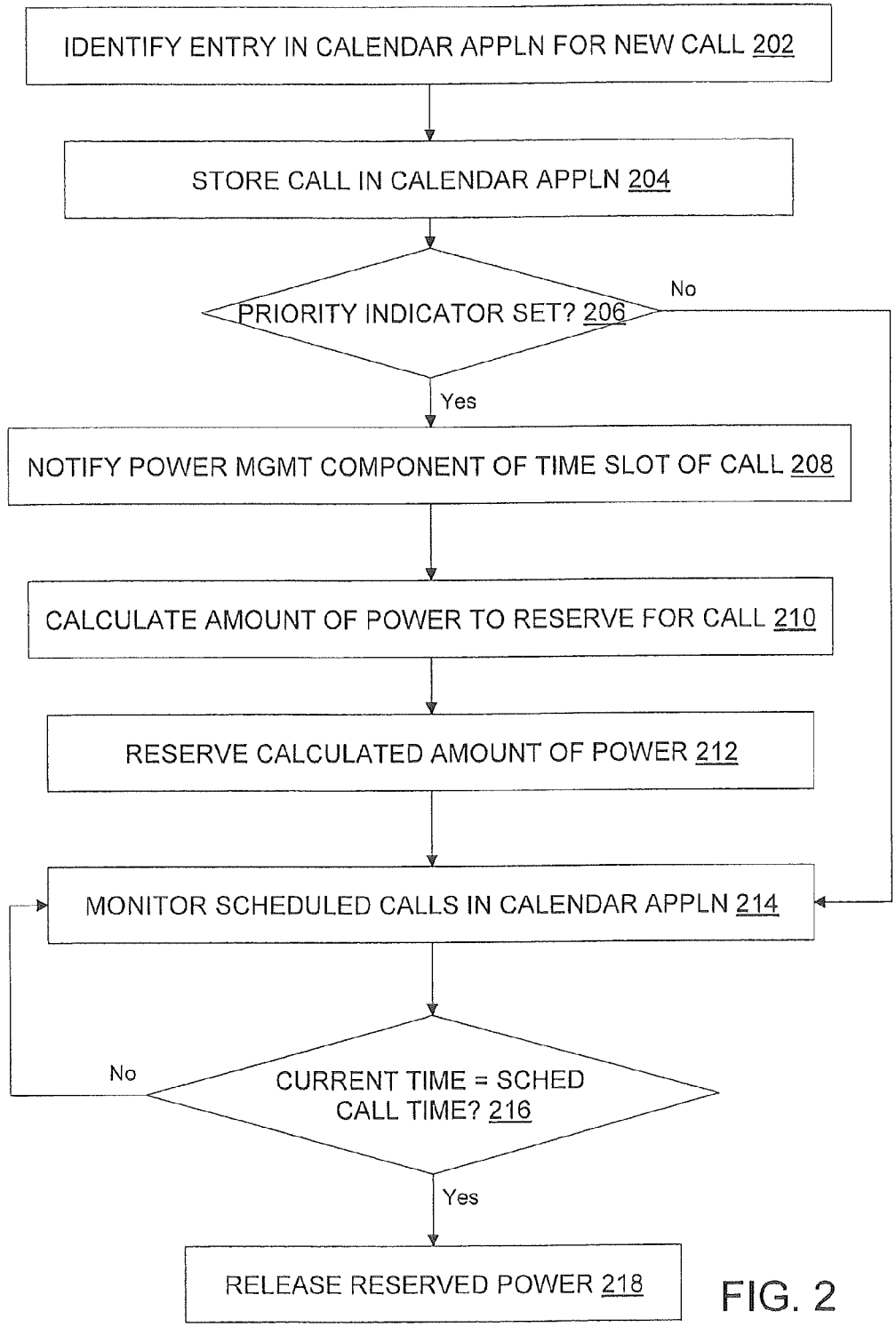
FIG. 2 depicts a flow diagram describing a process for implementing the calendar-based power reserve according to an embodiment of the present invention.
Figure 3:
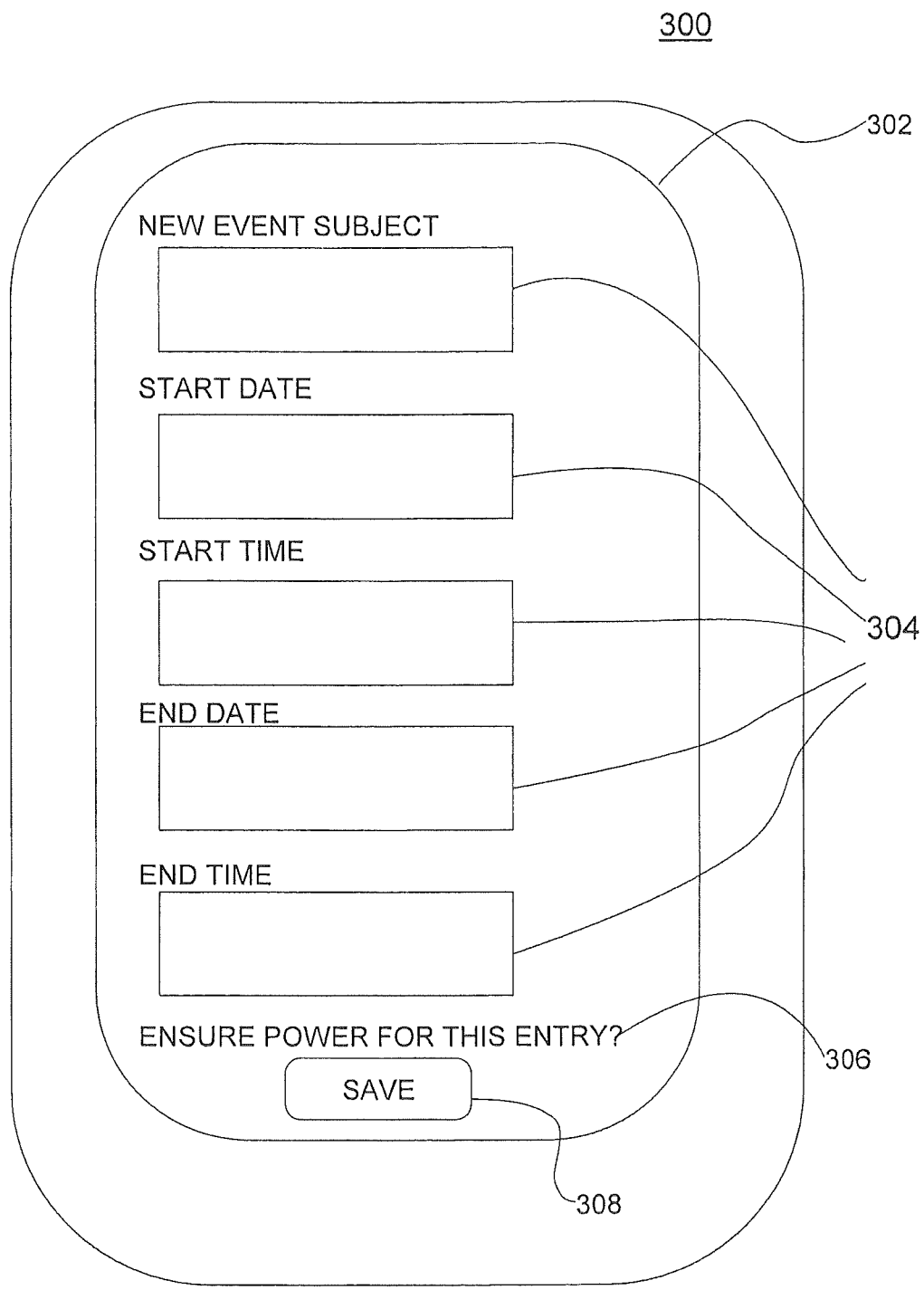
FIG. 3 depicts a mobile communications device and user interface screen according to an embodiment of the present invention.

Turning now to FIG. 2, a process for implementing calendar-based reserve features will now be described. The process described in FIG. 2 assumes that a user has opened the calendar application 108 and has entered a new event into the calendar application 108 of the mobile communications device 102. Alternatively, the user may have received a meeting invite from another user that designates a particular time slot, and the user accepts the meeting invite (i.e., new event) which, in turn, causes the calendar application 108 to schedule the meeting into the user's calendar. The new event is a telephone call to be placed on the date (and optionally time) entered into the calendar application 108. The new event may be scheduled into the calendar application 108 via a user interface screen 300, which is shown in FIG. 3.

The user interface screen 300 includes input fields 304 that prompt the user to enter the subject of the event (e.g., "Call Hiroki-san"), as well as starting dates/times and ending dates and times associated with the call (i.e., a call time and duration). Alternatively, if the new event is a meeting invite, as described above, the inputs of the starting dates/times and the ending dates and times may be omitted. The user is then prompted by the power reserve application 110 via the calendar application 108 to designate whether the scheduled event is a priority. The user designates a priority by selecting a priority indicator 306, which is illustrated in FIG. 3 as "ENSURE POWER FOR THIS ENTRY?" The priority indicator determines whether the power reserve application 110 will reserve power specifically for the scheduled call. The user makes this selection when it is imperative that the mobile communications device 102 have sufficient power to conduct the scheduled event. Once the event has been scheduled, the user can save the event into the calendar application 108 by selecting "SAVE" 308 on the user interface screen 300.

Figure 4:
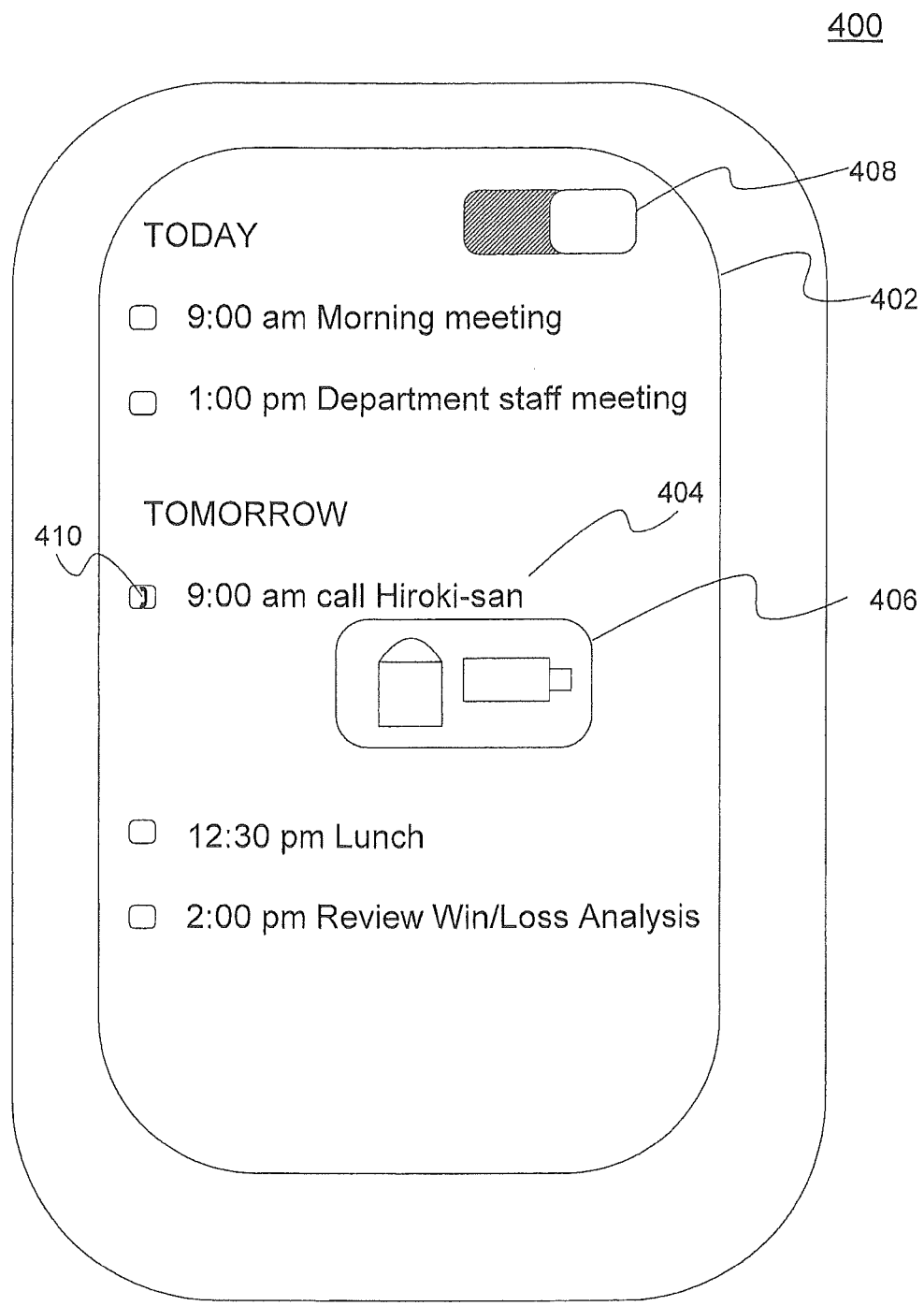
FIG. 4 depicts a mobile communications device and user interface according to another embodiment of the present invention.

Returning now to FIG. 2, the power reserve application 110 identifies the new calendar entry scheduled into the calendar application 108 as a telephone call at step 202. As shown in a user interface screen 400 of FIG. 4, a telephone call indicator 410 is adjacent to the scheduled calendar entry 404. At step 204, the new calendar entry is stored in the calendar application 108.

At step 206, the power reserve application 110 checks to see if the priority indicator 306 has been set by the user for this event. If the priority indicator 306 has been set for the new calendar entry at step 204, the power reserve application 110 notifies the power management component 104 of the date (and time, if applicable) of the calendar entry at step 208. In one embodiment, the power reserve application 110 calculates an amount of power to reserve for the calendar entry at step 210. This may be implemented using the duration of the call as specified in the calendar entry (e.g., via start and end times from inputs 304), and the amount of power needed for this duration is estimated by the power reserve application 110.

At step 212, the power reserve application 110 instructs the power management component 104 to reserve an amount of power for the scheduled calendar entry. If the calendar entry specifies a time duration and the power reserve application 110 has calculated an estimated amount of power needed for the scheduled event, this estimated amount is the amount of power reserved for the event.

The power reservation may be implemented using various techniques. In one embodiment, e.g., the power may be reserved by logically partitioning the storage of the battery and relocating the reserved amount of power to a particular partitioned location. Alternatively, the power reservation may be implemented by updating the battery power indicator on the mobile communications device to reflect a decrease in the capacity without relocating the reserved power to a different storage location. In this example, the capacity of the battery power remains the same but the battery power indicator reflects that a lesser amount of battery power is available.

In one embodiment, the power management component 104 may maintain a database (e.g., stored in the mobile communications device 102) including the meeting time slot and the percentage or amount of power reserved.

The power reserve application 110 instructs the power management component 104 to update a battery power indicator 408 on the mobile communications device 102 to reflect a capacity of the battery. The capacity reflects the current amount of available power for the battery minus the amount of power to be reserved for the scheduled call and any intervening calls in which power has been reserved.

The power reserve application 110 displays a reserve indicator 406 adjacent to the scheduled calendar entry in which the priority indicator 306 has been set.

At step 214, once the amount of power has been reserved, or alternatively, if the priority indicator 306 has not been set (from step 204), the power reserve application 110 monitors upcoming scheduled events (calls) in the calendar application 108. This may be implemented by traversing the calendar entries and checking for those marked as telephone calls by the calendar application 108.

At step 216, in response to the monitoring, the power reserve application 110 determines whether the current time is equal to or within a specified threshold of time identified for a scheduled call, e.g., using the mobile communications device's 102 internal clock. If not, the power reserve application 110 continues to monitor the scheduled calls in the calendar application 108. Otherwise, at step 218, the power reserve application 110 instructs the power management component 104 to release the amount of reserved power so the user may conduct the call without interruption caused by inadequate battery power.

In one embodiment, if a user's event is scheduled for a duration that is longer than the duration for which remaining batter power is available, the power reserve application 110 may notify the user via the mobile communications device 102 that it will reserve all remaining battery power, and/or the power reserve application 110 will prompt the user to immediately recharge the mobile communications device 102. If the user moves or alters a scheduled event, the power reserve application 110 may be configured to update the instructions to the power management component 104 to reserve the amount of power for a different date/time or duration, or adjust the amount of power reserved accordingly. If the event is cancelled, the amount of reserved power is released back into the pool of battery power available, and the battery power indicator 408 is updated to reflect the change in amount of available power.

In one embodiment, the power reserve application 110 may be configured to enable a user to override or disable the priority indicator 306 at any time to ensure there is sufficient power available should the user unexpectedly need the additional power.

In another embodiment, the power reserve application 110 may be configured to provide user-selectable policy settings for implementing the power reserve features. For example, other priority settings may be employed, such as "optional attendance" whereby the power reservation for "must attend" meetings (e.g., through option 306) would take precedence over those designated as "optional attendance," and any power reserved for "optional attendance" meetings may be reassigned to "must attend" meetings based on the overall amount of power available at a given time. Other policy settings may include power reservations based on characteristics of a meeting (e.g., my attendance is mandatory for meetings with my executives/manager), a user role in a meeting (e.g., an initiator of the meeting must have power reserved for the meeting), and a genre of the meeting where an amount of power reserved is determined based specifically on the genre (e.g., ensure a greater percentage of power reserved for meetings implemented using video, web hosting, or other applications requiring greater amounts of power). Tentatively accepted meetings may be treated by the power reserve application 110 in a similar manner as "optional attendance" meetings except that the power reservation is implemented once the meeting status goes from "tentative" to "accepted."

By providing a priority indicator option, users of mobile communications devices can ensure they will have sufficient battery power without having to continuously monitor their devices.

Technical effects of the invention include calendar-based power reserve features that enable a user of a mobile communications device to reserve and lock an amount of battery power in the mobile communications device for utilization during an upcoming scheduled event where the user has indicated within the calendar entry that his/her attendance via the mobile communications device is important or mandatory. The calendar-based reserve provides a user interface via a calendar application in which a priority indicator is selected for such important or mandatory calendar events. The calendar-based reserve features provide the means to calculate an estimated amount of power needed for a scheduled calendar event using a time duration specified in the calendar event.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A mobile communications device, comprising:
   a computer processor; and
   a power reserve application executable by the computer processor, the power reserve application configured to implement a method, the method comprising:
   identifying a new calendar entry scheduled into a calendar application of the mobile communications device, the new calendar entry specifying a telephone call; and
   upon determining a priority indicator has been set for the new calendar entry in the calendar application:
   directing a power management component of the mobile communications device to reserve an amount of power for the telephone call; and
   updating a battery power indicator that is displayed on the mobile communications device to reflect a capacity of a battery of the mobile communications device, the capacity reflecting a current amount of available power for the battery minus the amount of power to reserve;
   wherein the power reserve application is further configured to implement:
   monitoring calendar entries scheduled into the calendar application, the calendar entries indicative of telephone calls at least one of which has a corresponding priority indicator set; and
   upon determining a current time is within a threshold period of time associated with one of the calendar entries having the priority indicator set, releasing reserved power for the one of the calendar entries, and updating the battery power indicator to reflect the reserved power released for the one of the calendar entries.

2. The mobile communications device of claim 1, wherein the power reserve application is further configured to implement:
   prompting a user of the mobile communications device to select the priority indicator responsive to the identifying the new calendar entry.

3. The mobile communications device of claim 1, wherein the identifying a new calendar entry includes identifying a date and duration of the telephone call from inputs received from a user of the mobile communications device via the calendar application, the mobile communications device further comprising:
   calculating the amount of power to reserve, the calculating being a function of the duration of the telephone call.

4. The mobile communications device of claim 1, wherein the directing a power management component of the mobile communications device to reserve an amount of power for the telephone call includes directing the power management component to physically partition storage in the battery and relocate the reserved amount of power to a partition defined for holding reserved power.

5. The mobile communications device of claim 1, wherein the directing a power management component of the mobile communications device to reserve an amount of power for the telephone call includes directing the power management component to update the battery power indicator on the mobile communications device to reflect a decrease in the capacity without relocating the reserved power to a different storage location.

* * * * *